2,793,441

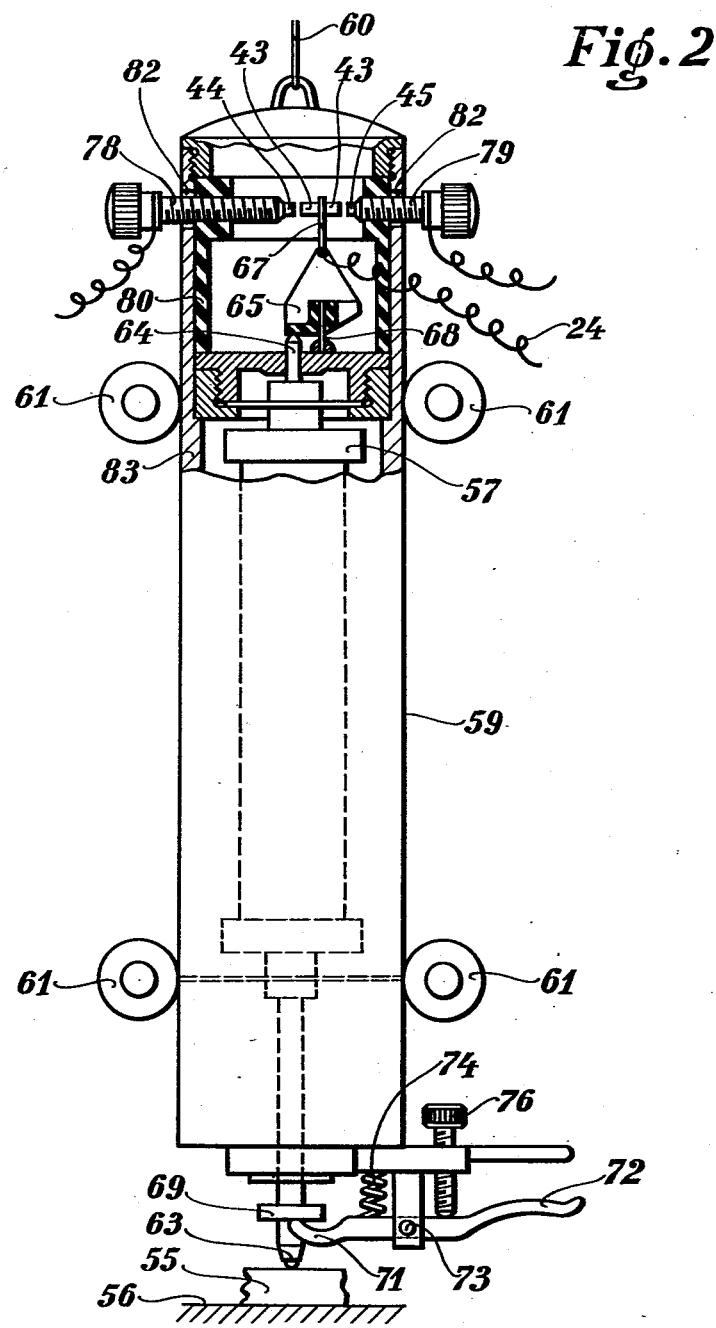

ELECTRONIC SWITCH FOR DIMENSIONAL LIMIT GAUGE AND OTHER PURPOSES

Helmuth Frenk, Wetzlar (Lahn), Germany, assignor to Ernst Leitz G. m. b. H., a corporation of Germany Application October 4, 1955, Serial No. 538,486

Claims priority, application Germany October 8, 1954

8 Claims. (Cl. 33—172)

The present invention pertains to electronic switches and more particularly to switches of this character which are suitable for use with contact-making limit gauges or other instruments equipped with delicate contacts.

Tolerance-measuring devices are known in which a measuring element controls electric contacts which are connected to various electric circuits, together with indicating means, such as, for example, incandescent lamps, in order to indicate the measurements of the test specimen. However, these devices have the drawback that in the course of time, the position of the contact stop will change through the burning-off of the contacts or a microscopic drift, and thus give rise to faulty measurements.

I have found that I can overcome these disadvantages by connecting the contacts in the grid circuits of electron tubes. However, this involves considerable additional expenditures in that, for example, the tubes have to be supplied with anode current delivered from rectifiers. In addition, amplifying devices, such as relays, had to be embodied in the circuit to operate the indicating means.

The invention makes it possible to use the above described contact arrangement with a minimum of expense. The invention is characterized in that the contacts which are controlled by a common measuring element and which are to be protected against burning by the use of extremely small contact loads are connected in the grid circuits of a double tube having two similar electrode systems, for example a double triode. The tube is energized by alternating current. In the event of measurements outside the range of tolerance for the specimen to be tested, the corresponding grid circuit is short-circuited by the contact and the current passing through corresponding electrode system actuates either directly or by means of a transformer, an indicating means. In addition, the indicating means for measurements outside of the tolerance limits are connected into the anode circuits which are separated with respect to the two electrode systems or alternatively, such indicators are coupled to said anode circuits.

An indicating means is connected or coupled to the common portion of the two anode circuits, said indicating means indicating conformity with the specified tolerance limits of the object to be tested. Preferably, the contacts are adjustable, in order that any desired tolerance range may be set in advance. The indicating means may, for example, comprise differently colored incandescent lamps, being at least partially connected directly into the anode circuits or the common portion thereof, or else, are coupled to the latter by means of transformers. The last mentioned transformer connection is particularly favorable for the incandescent lamp indicating the correct measurement, if said lamp is connected in a separate circuit through which there simultaneously passes a current having the same intensity as the plate current of the twin tube, but going in the opposite direction.

In dimensional limit gauges of this character, circuit control contacts are provided which may have a very small travel for close tolerances and which must open and close with extreme precision in accordance with the value of a critical measured dimension of each test specimen. The maximum permissible contact load or circuit interrupting capacity of the gauge contacts is therefore restricted to such an extremely small value that no arcing or burning can possibly occur which might otherwise produce microscopic dimensional changes of the gauge contacts. Any such dimensional changes of the limit gauge or other instrument contacts will cause inaccuracy of response to the critical tolerance limits for which the gauge has been adjusted. The switch may also be used with delicate contact equipped instruments such as, for instance, capillary column mercury thermostats.

The electronic switch of the limit gauge of the present invention represents an improvement over conventional switches of this character in that it is self-rectifying so that it is suitable for energization from an alternating current power supply circuit without the provision of any separate rectifier or other source of direct current anode potential. The open circuit voltage at the instrument contacts is sufficiently high to break through any microscopically thin coating which may accumulate through atmospheric conditions and at the same time the maximum current flow is limited to such a small value that no arcing or burning can occur at the instrument contacts.

A feature of the invention resides in the provision of directly controlled indicating means, such as incandescent lamps, which require no relays in the anode circuits of the electronic control tube.

A further feature of the invention resides in the provision of three indicating devices, one of which is energized under open control circuit conditions, with each of the other two being selectively individually energizable by the closure either of a high or a low limit contact of the gauge or other contact equipped instrument. Closure of either the high or low limit contact deenergizes the indicating device which is energized under open circuit conditions.

Various other objects, features and advantages of the invention will become apparent upon reading the following specification together with the accompanying drawing forming a part hereof.

Referring to the drawing:

Figure 2 is a diagrammatic elevational view, partly broken away, of a dimensional limit gauge to which the electronic switch of Fig. 1 is connected.

Figure 1:
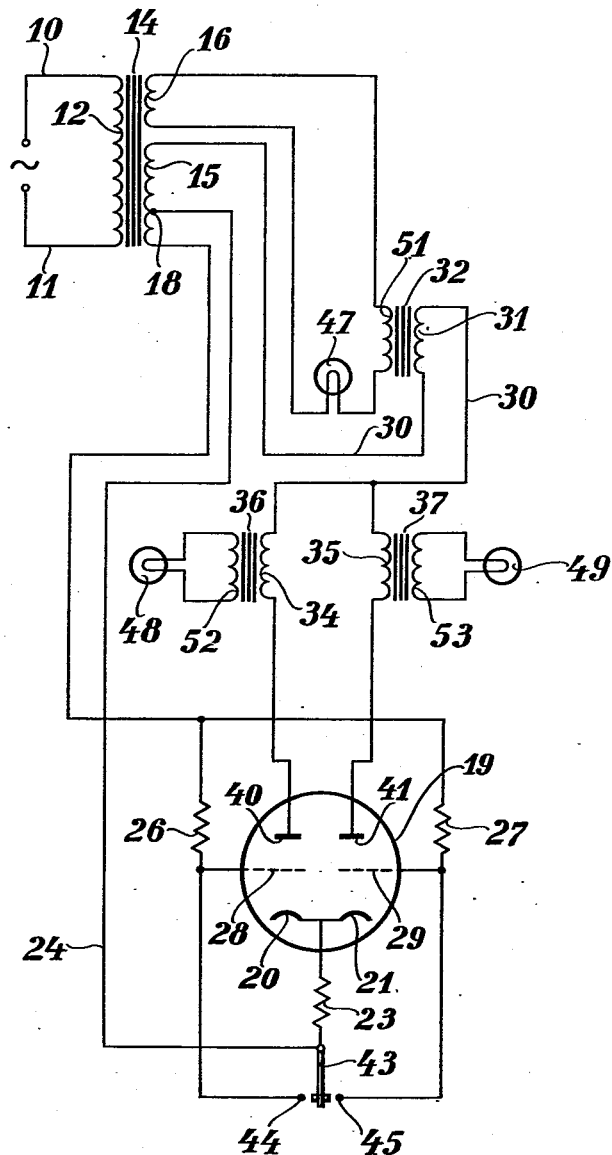
Figure 1 is a schematic circuit diagram of an electronic switch in accordance with the invention.

Referring to Fig. 1, alternating current power supply conductors 10 and 11 are connected to the primary winding 12 of a power supply transformer 14. The power transformer 14 is provided with two secondary windings 15 and 16, the secondary winding 15 being tapped at 18.

A twin triode 19 is provided with two cathodes 20 and 21 which are connected together. The cathodes 20 and 21 are connected through a common cathode resistor 23 and over a conductor 24 to the tap point 18 of secondary winding 15. The lower portion of secondary winding 15 is connected through current limiting high resistance grid resistors 26 and 27 to the grids 28 and 29, respectively, of the twin triode 19.

The upper portion of secondary winding 15 is connected for energization of twin triode 19 via a conductor 30 and through a primary winding 31 of a common indicator transformer 32, conductor 30 being branched to extend to twin triode 19 through primary windings 34 and 35 of two further indicator transformers 36 and 37, respectively. The individual branch circuits through indicator transformer windings 34 and 35 extend separately to the two anodes 40 and 41, respectively, of twin triode 19.

Conductor 24 from tap point 18 extends to a movable control contact 43 which is selectively engageable with either of two stationary adjustable contacts 44 or 45. A preferred physical arrangement for these contacts in a dimensional limit gauge is illustratively shown in Fig. 2 and is described in greater detail below.

In Fig. 1, there are three indicating lamps 47, 48 and 49 which are controlled by gauge contacts 43—44—45. Each of the lamps 47, 48 and 49 is preferably arranged to provide a distinctive color of illumination for ready identification. Lamp 47 is connected to a secondary winding 51 of common indicating transformer 32 and also to the secondary winding 16 of power transformer 14, the lamp 47 and transformer secondary windings all being connected together in a series circuit. The lamp 48 is directly connected to a secondary winding 52 of indicating transformer 36 and the lamp 49 is similarly connected to a secondary winding 53 of indicating transformer 37.

Referring to Fig. 2, there is shown a portion of a complete limit gauge for dimensional measurements. The complete gauging device is described in detail in the copending application of Wilhelm Rinker, Serial No. 359,525 filed on June 4, 1953.

A specimen 55 to be gauged is positioned upon a table 56. Vertically movable gauge member 57 is carried within a cylindrical body 59. The cylindrical body 59 may be raised and lowered by a supporting cable 60 laterally guided by roller bearings 61 during vertical movement thereof. When the vertical position of cylindrical body 59 has been adjusted for the limit gauging of a production run of test specimens having a certain nominal dimension, locking means, not shown, hold the cylindrical body 59 vertically fixed. At its lower end gauge member 57 is provided with a tip 63 for engagement with the specimen under test. At its upper end, gauge member 57 terminates in a tip 64 which actuates the control contacts 43—44—45. The movable control contact 43 is connected both mechanically and electrically to a tiltable lever 65 by a resilient arm 67. The lever 65 is connected to the cylindrical body 59 by a leaf spring 68 which yieldingly urges lever 65 in a counterclockwise direction so that it abuts against the upper end of the tip 64 of gauge member 57.

Immediately above the lower tip 63 of gauge member 57 there is a fixed flange or collar 69 which engages the left hand end portion 71 of a manually operable lever 72. The lever 72 is pivoted to the cylindrical body 59 at 73. A helical compression spring 74 urges end 72 of the manual lever 71 upwardly to let down gauge member 57 so that contacts 43 and 44 are closed and resilient arm 67 is flexed with no specimen in position. The lower tip 63 of gauge member 57 is raised sufficiently by pressing downwardly the outer free end 72 of lever 71 by hand against the pressure of spring 74 so that a specimen larger than the maximum tolerance dimension may be inserted freely thereunder on table 56. With the specimen 55 in position, the inner end of lever 71 is pressed downwardly by the helical compression spring 74, thereby permitting the tip 63 to move down into engagement with the test specimen for measurement thereof. The upward movement of the outer free end of lever 72 is limited by an adjustable stop screw 76. The adjustment of stop screw 76 is set so that the downward movement of tip 63 will be sufficient to engage the minimum size specimen likely to be encountered and thus assure engagement between contacts 43 and 44 if the measured dimension of the specimen is less than the minimum tolerance limit.

The adjustable control contacts 44 and 45 are carried by the inner ends of adjustment screws 78 and 79, respectively. The screws 78 and 79 are threaded in a supporting member 80 formed of insulating material. Insulating supporting member 80 is fixedly positioned in cylindrical body member 59. The adjustment screws 78 and 79 extend through clearance holes 82 formed in the tubular shell portion 83 of body member 59.

In performing the gauging operation described above, with lever 72 manually pressed upwardly and with the tip 63 of gauge member 57 in engagement with the test specimen 55, the movable contact 43 will be spaced away from both of the adjustable contacts 44 and 45, provided the measured dimension of the specimen 55 is within the tolerance limits for which the gauge is adjusted. Under these conditions, the lower portion of power transformer secondary winding 15 maintains both grids 28 and 29 at a potential which is opposite in phase with respect to the potential of the upper portion of secondary winding 15. The total anode current of twin triode 19 is thus at a minimum and may be zero. The voltage of power transformer secondary winding 16 is sufficient to light lamp 47 when no opposing voltage is induced in the secondary winding 51 of indicator transformer 36. Little or no current flows through the primary windings 34 and 35 of indicator transformers 36 and 37 and lamps 48 and 49 are therefore extinguished. Under these conditions, the lamp 47 is lighted indicating that the test specimen is "Good" and is within the permissible range of dimensional tolerance.

If, however, the measured dimension of the specimen is under or less than the tolerance for which contact 44 has been adjusted, then movable contact 43 will engage adjustable contact 44 closing a circuit which brings the grid bias on grid 28 to a value determined by cathode biasing resistor 23 and the anode current through anode 40 will assume a maximum value. The half-wave pulsating current which flows to anode 40 under these conditions will induce a voltage in the secondary winding 52 of indicator transformer 36 lighting the lamp 48. This indicates that the dimension of the test specimen is "Low" or smaller than the permissible tolerance. The current flowing through primary winding 34 of indicator transformer 36 also flows through the primary winding 31 of common indicator transformer 32. The polarity of indicator transformer secondary winding 51 is opposite to that of power transformer secondary winding 16 so that the current flow to anode 40 generates a voltage in secondary winding 51 which is substantially equal and opposite in phase with respect to the voltage of power transformer secondary winding 16. Since the voltage difference between secondary windings 16 and 51 is substantially zero, or at least sufficiently small for the purpose, the "Good" indicating lamp 47 becomes extinguished at the same time that the "Low" indicating lamp 48 becomes lighted.

If the measured dimension of the specimen is greater than the permissible tolerance so that contacts 43 and 45 are closed, anode 41 draws current through indicator transformer primary winding 35 causing indicator lamp 49 to become lighted indicating that the dimension is "High" while at the same time extinguishing "Good" lamp 47. This is similar to the operation of "Low" indicating lamp 48, described above.

The electronic switch of Fig. 1 when used with a limit gauge as described in connection with Fig. 2 provides certain outstanding advantages. The instrument contacts 43, 44 and 45 are all connected to the secondary winding 15 of power transformer 14 and this secondary winding is insulated from the primary winding 12. Accordingly, there is no possible danger of electrical shock from power supply conductors 10 or 11 if the operator of the limit gauge should touch any of the gauge contacts.

Conductor 24 may be grounded to the frame of the gauge and the high resistances of current limiting grid resistors 26 and 27 may be made sufficiently large to limit the maximum current flow at control contacts 43—44—45 to a few microamperes, such a small current cannot be felt or detected sensually if it flows through the body of the operator. Furthermore, such a small current cannot possibly cause arcing or burning of the control contacts 43, 44 and 45. The grid potentials can be kept low so that the insulation of the control contacts is not required to withstand high voltage. The grid potentials may be made sufficiently high, however, so that a slight film of oil, dust or the like on the control contacts will not prevent circuit closure.

Additionally, since each of the three indicator lamps 47, 48 and 49 is energized from a transformer secondary winding which draws its energy through an anode circuit of triode 19, the lamps may be of very small or miniature size and may be operated at low voltage, thereby permitting all three lamps to be mounted in close proximity to each other on the limit gauge. This avoids the necessity for a further voltage reducing transformer for energization of the miniature indicating lamps.

I have described what I believe to be the best embodiments of my invention. It will be apparent to those skilled in the art, however, that many changes and modifications may be made therein without departing from the scope of the invention as defined in the appended claims.

What is claimed is:

1. A dimensional limit gauge of the class described, comprising: gauge means including control contacts, a first control contact being provided which is actuated when a specimen being measured by said gauge is above a predetermined limit of dimensional tolerance and a second control contact being provided which is actuated when said specimen is below said limit of tolerance; a source of alternating current; double space discharge tube means comprising at least one cathode, two grids and two anodes; first circuit means for energizing said grids and said anodes from said source in opposite phase with respect to said cathode, said first circuit means comprising two current limiting resistors each individually connected in series with one of said grids; second circuit means connecting said first control contact to one of said grids and extending to a point in said first circuit means where actuation of said first control contact will cause an increase in current flow to one of said anodes; third circuit means connecting said second control contact to another one of said grids and extending to a point in said first circuit means such that actuation of said second control contact will cause an increase in current flow to another one of said anodes; individual indicating means connected to each of said anodes for energization from said source in response to increased current flow to any one of said anodes; further indicating means connected to said first circuit means for continuous energization from said source; and common circuit means included in said first circuit means and connected to said further indicating means and to all of said anodes, said common circuit means comprising means for generating a voltage in response to current flow through any of said anodes, said voltage being connected to oppose the voltage which causes said continuous energization of said further indicating means from said source for effectively deenergizing said further indicating means upon energization of any of said first-named indicating means.

2. A limit gauge according to claim 1, further comprising an insulating transformer included in said first circuit means, said insulating transformer having a primary winding connected to said source and a tapped secondary winding insulated from said primary winding the tap of said secondary winding being connected to said cathode and different portions of said secondary winding lying on opposite sides of said tap being connected in phase opposition for simultaneous energization of said grids and said anodes respectively.

3. A limit gauge according to claim 1, wherein said first and second control contacts are adjustably mounted in said gauge to vary the dimensional range included within said limits of tolerance.

4. A dimensional limit gauge of the class described, comprising: gauge means adapted for engagement with a specimen to be measured; a first control contact actuable by said gauge means when the dimension of the specimen being measured is above a predetermined limit of tolerance; a second control contact actuable by said gauge means when said dimension is below a predetermined limit of tolerance; a source of alternating current; a power transformer having a primary winding connected to said source and two secondary windings both insulated from said primary winding, one of said secondary windings being tapped; a pair of space discharge devices, each having an anode, a cathode and a control grid; three indicating transformers each having a primary winding and a secondary winding; an anode energization circuit extending from a portion of said one power transformer secondary winding at one side of the tap thereof through the primary winding of one of said indicating transformers and branching individually through the primary windings of the other two of said indicating transformers to said two anodes; a grid circuit extending from the portion of said one power transformer secondary winding at the other side of said tap and branching through individual current limiting resistors to each of said two grids; a cathode circuit extending through a cathode resistor to said tap; two control circuits each connecting one of said control contacts to one of said grids, each of said control contacts cooperating with a contact which is connected to said tap; two indicating means each connected to the secondary winding of one of said other two indicating transformers; and a third indicating means connected in a series circuit which comprises the secondary winding of said one of said indicating transformers connected in opposing relationship with respect to the other secondary winding of said power transformer, said secondary winding of said one indicating transformer having a voltage induced therein which opposes the voltage of said other secondary winding of said power transformer and effectively deenergizes said third indicating means during current flow to either of said anodes accompanying actuation of either of said control contacts.

5. A limit gauge according to claim 4, in which each of said indicating means consists of a lamp, each lamp being arranged to provide a distinctive color of illumination.

6. An electronic switch of the class described comprising: cathode means; a plurality of anodes each arranged to receive electrons from said cathode means; an individual control grid for each anode; a source of alternating current; first circuit means for energizing all of said anodes from said source; second circuit means connected to said source for energizing all of said grids therefrom in phase opposition with respect to said anodes, said circuit means comprising a plurality of individual current limiting means each connected in series with one of said grids; a plurality of control circuits each connected directly to one of said grids and to said cathode means, each of said control circuits being adapted for connection to independent control contacts; and a plurality of indicating means each connected to one of said anodes; and common indicating means connected in said first circuit means and connected to all of said anodes for providing a concurrent indication with any of said first-named indicating means.

7. An electronic switch according to claim 6 in which said common indicating means is connected in said first circuit means and to said anodes by means of a transformer which has a winding in which a voltage is induced by current flow to any of said anodes, said common indicating means being connected to said winding.

8. An electronic switch according to claim 7, further comprising means continuously energized by said source and providing a voltage which is substantially equal and opposite to said winding voltage, said continuously energized means being connected in series with said winding and said common indicating means to oppose said voltage of said winding for effectively deenergizing said common indicating means concurrently with the energization of any of said first-named indicating means.

References Cited in the file of this patent

UNITED STATES PATENTS

| | | |
|---|---|---|
| 1,894,025 | Dennison et al. | Jan. 10, 1933 |
| 1,911,656 | Van Benschoten | May 30, 1933 |
| 2,464,249 | McCoy | Mar. 15, 1949 |